Patented June 13, 1933

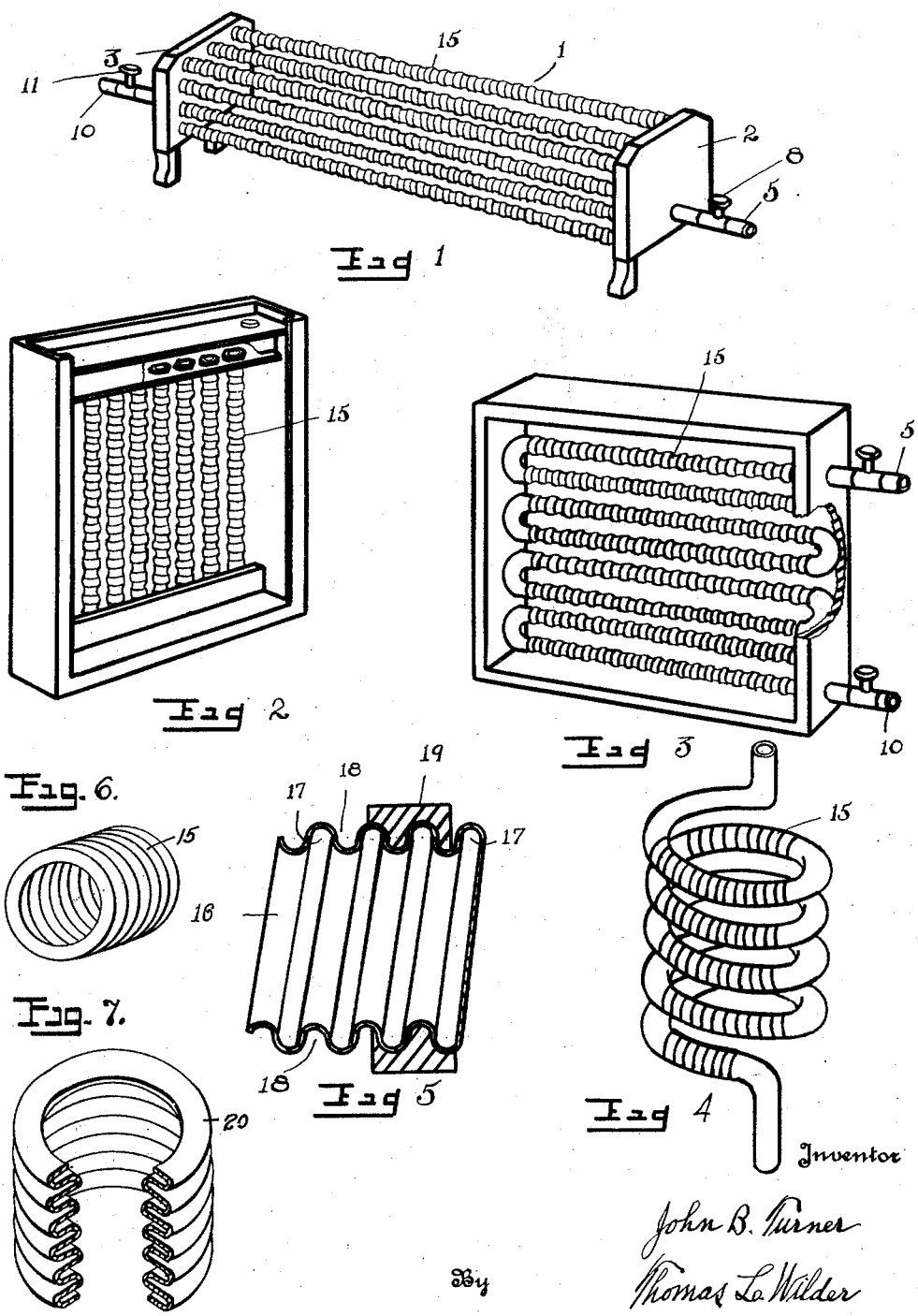

1,913,573

UNITED STATES PATENT OFFICE

JOHN B. TURNER, OF NORWICH, NEW YORK

RADIATOR

Application filed January 11, 1932. Serial No. 585,935.

My invention relates to a radiator and I declare the following to be a full, clear, concise and exact description thereof sufficient to enable anyone skilled in the art to which it appertains to make and use the same, reference being had to the accompanying drawing in which like reference characters refer to like parts throughout.

The object of the invention is to provide a radiator which will occupy less space, be much lighter in weight, less subject to damage or deterioration and yet allow for an increase in the number of thermal units passing therethrough. This increased efficiency is effected without in any way weakening the radiator. The reduction in both size and weight of the radiator is brought about by using a tubing with a thin metal wall of thin cross section of the metal helically or axially corrugated for the radiating surfaces.

The tubing is made of a single piece of metal. In the first instance it is a straight, one-piece, smooth, but relatively thinwalled, tubing and the walls are thereafter formed with helical or progressive spiral corrugations, or with axial or non-progressive corrugations.

It is understood that where hereinafter tubing or piping is described as flexible or corrugated it shall be construed to mean tubing or piping formed as described above.

The corrugations extend the entire surface of the tubing and provide for the formation of interior open helical indentations alternating with exterior open helical indentations. These indentations greatly increase the heat transmission possible through the walls of a given length of tubing.

The said indentations also make is possible to use a thinner wall section of tubing and yet allow a larger area for the passage of heat units through the metal wall of the tubing.

The invention can be used not only for the outward radiation of heat as in connection with the use of metal radiators, cooling coils and condensors, but also for inward radiation in connection with the heating surfaces in fire boxes, boilers, furnaces and the like.

It is designed to facilitate the transmission or radiation of heat from a liquid, vapor, or gas passing through said tubing to a surrounding liquid, vapor or gas, or from a surrounding liquid, vapor or gas on the outside of said tubing to a liquid, vapor or gas passing through the said tubing, whereby to more rapidly equalize said temperatures within and without said tubing.

The tubing is designed moreover to take up or absorb within itself any changes in its length which would normally occur because of expansion or contraction due to temperature variations; that is to say, the corrugations compress upon each other allowing for the expansion and contraction of said tubing without effecting a given or predetermined length thereof. This latter feature is particularly desirable in radiators, boilers, furnaces and the like to internally absorb with a bellows-like action any lengthening or shortening of the tubing because of expansion or contraction under temperature changes due to thermal effect on pipes or tubes connecting the headers. Normally the headers are fastened in a stationary position which cannot be varied without breaking the joints of the connection between the headers and tubes joining said headers, or damaging the headers or tubes.

The object of the invention will be understood by referring to the drawing, in which Figure 1 is a perspective view of a radiator showing my improvement.

Figure 2 is a modification showing a radiator with the flexible tubes in vertical position.

Figure 3 is a modification showing the flexible tubes assembled with return bends.

Figure 4 is a modification showing a radiator with the flexible tube in the form of a coil.

Figure 5 is a detail enlarged view showing a central section of the flexible tube with helical corrugations.

Figure 6 is a detail perspective view somewhat enlarged of the flexible tubing with helical corrugations.

Figure 7 is a detail perspective view showing a central section of the flexible tube with axial corrugations.

Referring more particularly to the drawing, a radiator is shown at 1 and comprises an inlet header or manifold 2 and an outlet header or manifold 3. When the radiator 1 is in place, one of the headers, as 2 is connected to an inlet pipe or tube 5 having a valve or cock 8. The other header 3 is connected to an outlet pipe 10 having a valve or cock 11. Headers 2 and 3 are connected by flexible pipes 15. Moreover each of the headers 2 and 3 has an interior chamber which is in communication with the interiors of horizontally disposed flexible pipes or tubes 15. Although we show three such pipes 15 in a horizontal row or plane and four vertical tiers or planes of said pipes 15, obviously any number may be employed to accommodate the size of radiator to be employed in the particular locality or room to be heated.

Each of the flexible pipes or tubes 15 is made of a single straight piece of tubing in which the cylindrical shell or wall has been helically corrugated. With these helical corrugations formed in said wall, each of the pipes 15 provides not only a large central interior chamber 16 but also a plurality of annular open interior indentations 17, communicating with said interior chamber 16 and also a plurality of exterior indentations 18 opening to the exterior and alternating with said interior chambers 17. The flexible pipes or tubes 15 are connected to the headers 2 and 3 by inserting their respective ends in suitable apertures made in said headers 2 and 3 and mounting or screwing on the inner end of each of the tubes or pipes 15 a nut 19. Each of the nuts 19 is provided with internal threads for threading to the helically formed grooves or indentations 18 made in the exterior of tubing or pipe 15. In place of using nuts 19, the ends of tubes 15 can be welded, brazed or soldered in place.

It is understood that although the use of helically corrugated tubing is indicated, axially corrugated tubing may be used in its place although, because of its form, other means of attaching the flexible tubing to headers 2 and 3 than by nuts 19 must be employed.

Both the interior annular indentations 17 and the exterior annular indentations 18 will aid in radiation by increasing the extent of surface of tube 15.

Moreover the corrugations in each of the pipes or tubes 15 increases the amount of metal wall for the transmission of heat either from the inside of pipe 15 to the outside or from the outside to the inside. It will be observed that the relative surface is increased not only externally but also internally, and that this increase is accomplished without adding to the actual thickness of metal at any point in tubes or pipes 15, or by applying separate pieces of metal thereto, and yet the ratio between the exposed wall surfaces of the tubing and internal diameter of chamber 16, effective for the free flow of liquids, vapors or gases is greatly increased.

Having thus described my invention what I claim is new and desire to secure by Letters Patent is:

In a radiator, flexible tubing having corrugations helically wound, said tubing providing internal helical indentations alternating with exterior open helical indentations, whereby to increase the heat transmission through the walls of said tubing, said corrugations allowing for a maximum area for the passage of heat through the metal walls of said tubes and said corrugations formed to absorb in a bellows-like manner the lengthening and shortening of said tubing, whereby to eliminate the effects of temperature changes.

In testimony whereof I have affixed my signature.

JOHN B. TURNER.